United States Patent
Maloney et al.

[11] Patent Number: 5,321,244
[45] Date of Patent: Jun. 14, 1994

[54] CODED CARD READER SYSTEMS

[75] Inventors: Conrad R. C. Maloney; Roger D. Swadling, both of Cheltenham, England

[73] Assignee: Newtronics, S.A., Luxembourg

[21] Appl. No.: 852,186

[22] PCT Filed: Nov. 30, 1990

[86] PCT No.: PCT/GB90/01866
§ 371 Date: Jul. 29, 1992
§ 102(e) Date: Jul. 29, 1992

[87] PCT Pub. No.: WO91/08554
PCT Pub. Date: Jun. 13, 1991

[30] Foreign Application Priority Data
Nov. 30, 1989 [GB] United Kingdom .......... 8927079

[51] Int. Cl.$^5$ .................................. G06K 7/10
[52] U.S. Cl. .......................... 235/454; 235/492; 235/480
[58] Field of Search ........... 235/494, 454, 492, 480; 360/2; 369/275.1

[56] References Cited
U.S. PATENT DOCUMENTS
4,237,376 12/1980 Giacomotti .......................... 360/2

*Primary Examiner*—Harold Pitts
*Attorney, Agent, or Firm*—Breiner & Breiner

[57] ABSTRACT

Optical card reader systems are known in which an optically encoded card is read to provide an output signal. However, in known systems, the card has to be presented in a particular orientation. Described herein is a card (80) which has three code zones (85, 86, 87), the upper zone (85) carries a code in one of its data streams from which a series of clock pulses is derived to assist in the processing of the data in the streams of the zones (85, 87) or (86, 87). Zones (85, 87) carry identical data presented in identical fashion. In order to determine the presentation of the card, start words (83, 84) can be utilised to indicate to the reader which way up and which way round the card is presented.

19 Claims, 7 Drawing Sheets

| STREAM 1 | STREAM 2 | STREAM 3 | STREAM 4 |
|---|---|---|---|
| A1 | $\overline{A1}$ XOR B1 | STREAM 2 XOR CLOCK $\emptyset$1 | $\overline{A1}$ |
| A2 | $\overline{A2}$ XOR B2 | STREAM 2 XOR CLOCK $\emptyset$2 | $\overline{A2}$ |
| A3 | $\overline{A3}$ XOR B3 | STREAM 2 XOR CLOCK $\emptyset$1 | $\overline{A3}$ |

CODED CARD READER SYSTEMS

FIELD OF THE INVENTION

This invention relates to card reader systems.

BACKGROUND OF THE INVENTION

Card reader systems are known in which a card reader is programmed to provide an output signal once an appropriately encoded card is presented to the reader, the output signal being used, e.g. to open a door. These systems may be electrical, optical, mechanical, magnetic or electronic. However, the cards presently used in such systems have to be presented to the reader in a particular way, for example, the card having to be a certain way up and with a given end presented to the reader first. This is inconvenient and, e.g. leads to user dissatisfaction, especially with non-constant users, e.g. hotel guests. The available added security of card-access systems is undermined by their difficulty of use in an unsupervised environment by an unskilled user, the casual guest.

We have now found that, with careful design of how encoding is put on to a card, these problems may be overcome, and easy to use secure card access made possible.

SUMMARY OF THE INVENTION

According to one aspect of the present invention, there is provided a card for an optical card reader system including at least two code zones, at least one code zone containing a code from which a series of clock pulses is derived.

Advantageously, each card has three code zones arranged along the length of the card, the central zone containing the code from which the clock pulse series is derived.

In a particularly preferred embodiment, the outer code zones contain identical data but one zone is the mirror-image of the other. In this case, the central zone comprises alternate mark-space pattern.

In an alternative embodiment, the data in the outer zones may be identical and presented the same way. In this case, an orientation word is included in the data to indicate the direction of presentation of the card.

The central zone may be encrypted with a combination of the data and a series of clock pulses.

The series of clock pulses derived from the central zone may be used to generate a reference level for adjusting the sensitivity of the card reader system.

Each code zone may contain a "hard," permanent code and a "soft," variable code, the "hard" code being applied to the card during its manufacture and which includes a unique random number. The "soft" code may be applied to the card on an adhesive paper strip, or be printed on to the card surface directly at the time of issue.

According to a second aspect of the invention, there is provided a card for use with an optical card reader system, the card including three code zones arranged along the length of the card, the two outer zones containing identical data which comprises a "hard," permanent code including a unique random number applied to the card during its manufacture, and the central zone containing a "soft," variable code, each zone including an orientation word to indicate the direction of presentation of the card to a card reader and, encrypted in the code, clock pulses for clocking the data into the card reader system as the card is inserted into or withdrawn from the card reader system.

Preferably the card is adapted for reading by transmitted radiation. However, if desired, reading may be by reflection, in which case it may be appropriate to provide the same coded data on both sides of the card, so that it does not matter which way up the user inserts the card into a card reader.

According to a third aspect of the invention, there is provided a card reader system for reading an optically coded card which includes two rows of sensors spaced apart, each row comprising at least two sensors, processing means, and a proximity switch, e.g. a microswitch, whereby insertion of the card into the reader activates the proximity switch to power the processing means, and enables data to be read from it, the data being processed by the processing means to produce an output signal.

BRIEF DESCRIPTION OF THE DRAWINGS

For a better understanding of the invention, reference will now be made, by way of example only, to the accompanying drawings in which.

DESCRIPTION OF PREFERRED EMBODIMENT

Figures 1, 4:
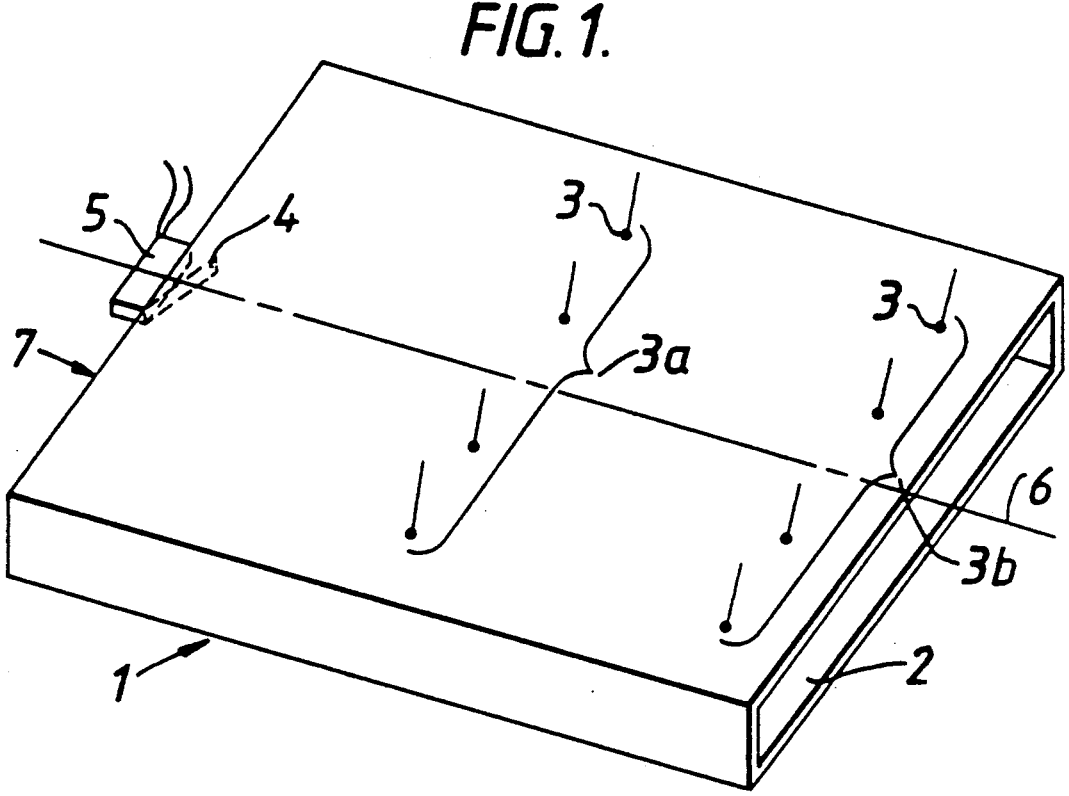
FIG. 1 illustrates a perspective view of an optical card reader according to the invention.
FIGS. 4 to 9 illustrate further embodiments of encoded cards.

Referring initially to FIG. 1, a card reader 1 is shown which includes a slot 2 into which a card (not shown) is placed to be read. Reading of the card is achieved by eight optical sensors 3 which are sensitive to infrared radiation and which are positioned as two rows 3a and 3b of four sensors as shown. Infrared sensors are convenient, but other wavelengths, e.g. optical or UV, may be used if desired. Insertion of a card fully into the slot 2 pushes against an operating arm 4 of a microswitch 5 which actuates processing electronics (not shown). Any other proximity switch arrangement to detect the presence of an inserted card can be used if desired, e.g. one activating the card immediately on insertion so the card can be read as it is inserted. As the card is withdrawn from the slot 2, the information stored on the card is read by the sensors 3, and the output signal from each sensor is passed to the processing electronics. As shown in FIG. 1, the two rows 3a and 3b of sensors are symmetrically arranged about a longitudinally extending centre line 6, the microswitch 5 being mounted on the line 6 at the rear end 7 of the reader 1. This symmetrical arrangement allows the card to be presented to the reader either way up and/or either way round.

Figure 2:
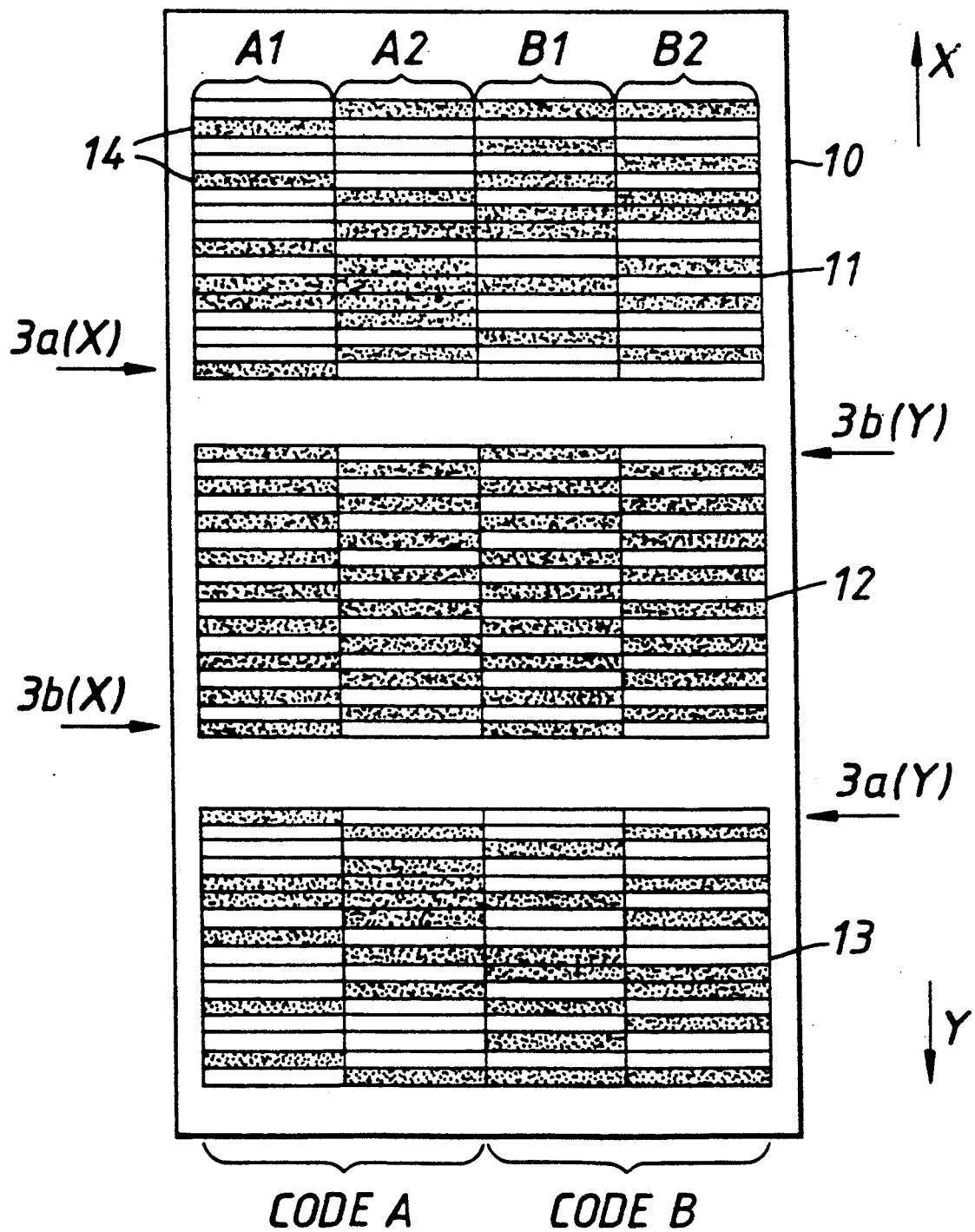
FIG. 2 illustrates an encoded card for use with the FIG. 1 reader.

Referring now to FIG. 2, a card 10 has two codes formed on it—code A and code B. In this illustrative embodiment, code A is a "hard" code and is put onto the card during its manufacture, and is normally covered by IR transparent, visible light opaque material so that it cannot be readily discerned by eye but can be read by the sensors. Code B is a "soft" code which is applied to the card to operate in conjunction with the "hard" code. For example, if the card/reader system is to be used in a hotel to provide access to a hotel room, the "soft" code may include data relating to the room number, the length of stay etc., and may be printed on to the card or on to a label which is then adhered to the card, when the hotel guest checks in. The "hard" code may include a random number relating only to the card to which it is applied. This is useful in hotel security applications. For example, the 'soft' code may include data representative of the previous history of the card reader system and new data. These may be processed by the system to teach the card reader to accept the card only if both new data and random number are appropriate.

Each code is applied to the card 10 over three regions 11, 12 and 13 and is stored in binary form. The binary form consists of portions 14 and 15 which are respectively opaque and transparent to infrared radiation. Each code is divided over two columns A1 and A2 for code A and B1 and B2 for code B, and consists of thirty-two bits of data, sixteen bits in each column. Data stored in region 11 is repeated in region 13 but as a mirror image which enables the card to be inserted either way round into the reader. The markings forming the code, and the material of the card are so chosen that the markings may be read by the sensors from either side of the card, thus enabling the card to be read irrespective of which way up it is inserted into the reader.

The region 12 is formed by four columns of alternate opaque and transparent portions 14 and 15 respectively, two columns per code and seventeen bits per column. For each code, the output obtained from the sensors scanning this region provides two series of clock pulses out of phase by 180° which can be used to time the data output from region 11 or 13. The two series of clock pulses can be combined to give an overall intensity level which can be used to adjust the sensitivity of the sensors scanning that particular code.

Arrows $3a(X)$ and $3b(X)$ in FIG. 2 indicate the respective positions of sensor rows $3a$ and $3b$ (of FIG. 1) relative to the card 10 when the card is inserted into the reader in direction X. Similarly, arrows $3a(Y)$ and $3b(Y)$ indicate the respective positions of sensor rows $3a$ and $3b$ when the card is inserted in direction Y.

The data on the card includes unique data at the start of the data sequence read from the card. This unique data or orientation word allows the reader to determine which way round the card is being presented, and may include the phase of the data clock. The orientation word is reversed if the card is turned over but presented in the same direction. Similarly, an orientation word can also be included at the end of the data sequence read from the card. However, this is not necessary in the card of FIG. 2 as the data is repeated as a mirror image at the other end of the card.

As the data is separated into two columns or streams with separate clocking arrangements, separate reference levels can be used for each code, thereby compensating for differences in optical densities for the two codes due to the difference in method of application. Each data column or stream can be compared by the processing electronics with the reference level for that particular code and the resulting data passed into the processing electronics at times determined by the edges of the clock signal. The clock signal is shifted with respect to the data by half a data pitch to allow correct reading of the sixteen bits of data.

Figure 3:
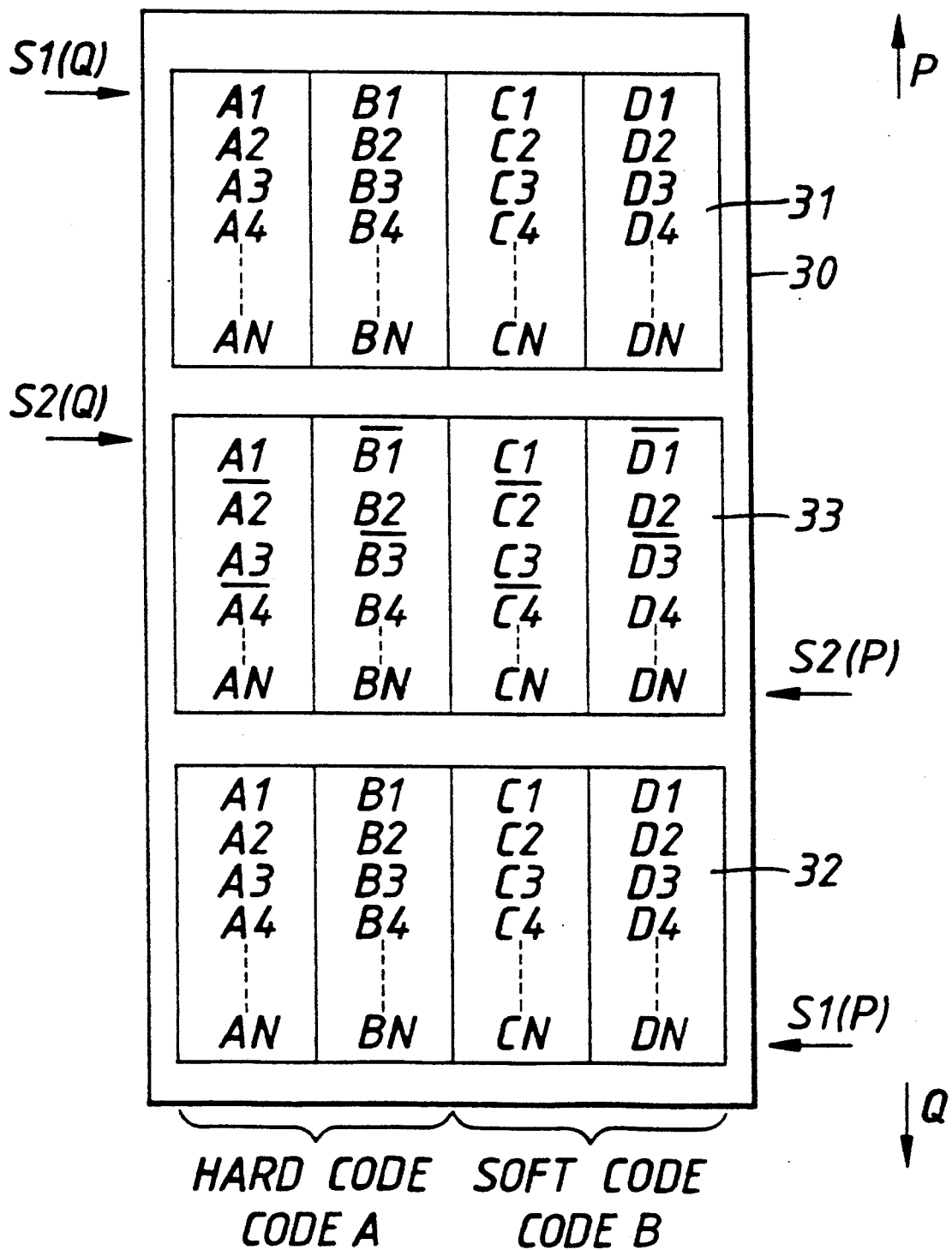
FIG. 3 illustrates a second embodiment of an encoded card.

The card 30 of FIG. 3 is similar to that of FIG. 2 in layout, that is, the two data zones 31 and 32 and the clock zone 33 are equivalent to regions 11, 13 and 12 respectively. However the data zones 31 and 32 are identical as shown and not mirror-images of each other. Zone 33 does not contain a simple arrangement for the provision of clock pulses as described with reference to FIG. 2, but has the clock information encoded with the data. For example, for a given stream of data:

A1, A2, A3, A4 ...

when the clock pulse is added to the stream 1, 0, 1, 0, ...

the data becomes

A1, $\overline{A2}$, A3, $\overline{A4}$, ...

That is, the state of the data is changed on a "zero" pulse. It would also be possible to change the state of the data on the "one" pulse if desired.

For the card of FIG. 3, the positions of the sensors would need to be altered with respect to FIG. 1, so that the data can be read out by sensors in positions S1 and S2, the bracketed variable relating to the direction of insertion of the card into the reader.

As before, codes A and B are respectively the "hard" and "soft" codes.

During processing of the output from zone 33, the clock signals can be isolated and used to provide reference levels for the codes as described previously. Furthermore, the processing electronics may include "first in, first out" (FIFO) and "first in, last out" (FILO) registers so that data can be read from either end of the data stream and processed in identical ways. In this situation, two orientation words are utilised, one at each end of the data. For example, a start word may be 1000 and an end word 0111, these words reversing to 0001 and 1110 respectively when the card is reversed. If the word 0111 or 1110 is detected first, a FILO register is required as data is being read from the end of the stream i.e. DN, DN−1, ... D2, D1. Similarly if the word 1000 or 0001 is detected first, data is being read from the start of the stream and a FIFO register is required.

The card illustrated in FIG. 4 carries codes which are encrypted onto the card in such a way so as to make the data read out both self-clocking and self-checking for valid read conditions. In this embodiment, two data streams are encrypted with clock information in such a way that two valid data conditions alternate for each data period. The valid data conditions are that "Stream 1" and "Stream 4" are always complementary and that "Stream 2" and "Stream 3" alternate between being complementary and equal. The processing electronics receive from "Stream 1" and "Stream 4" the complementary signals which indicate that card has been aligned properly in the card reader.

Figure 5:
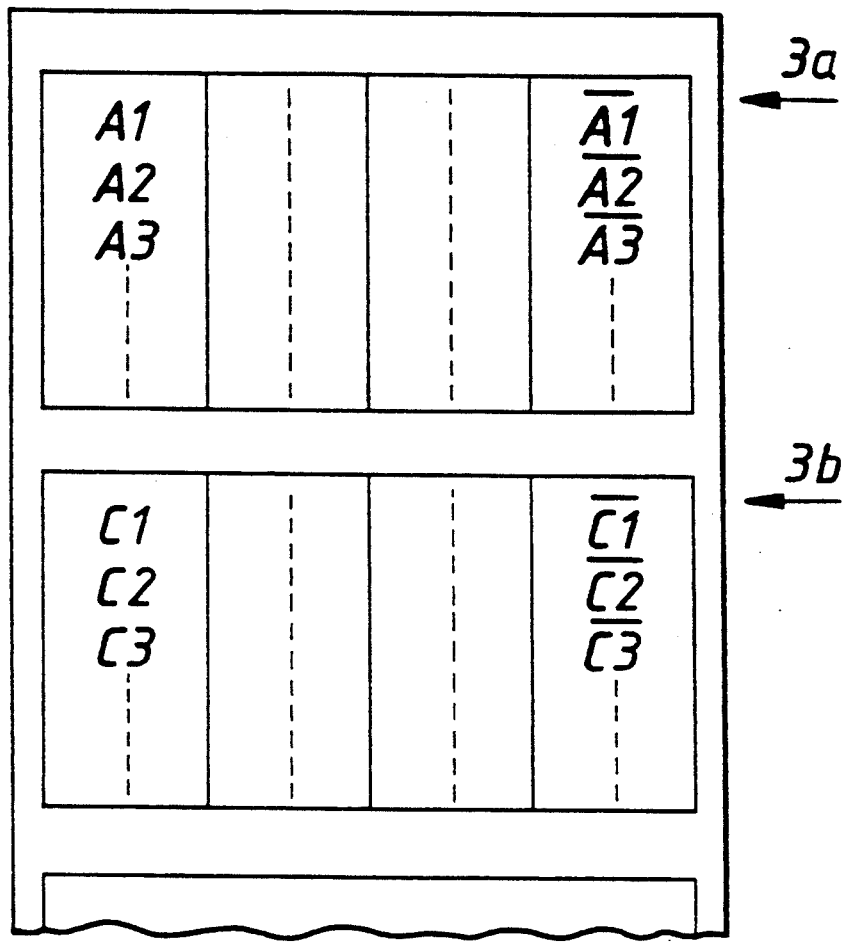

The card of FIG. 5 uses an orientation word at the start of the data to indicate which way the card has been presented to the reader. As before, two rows of four sensors $3a$ and $3b$ are indicated by the arrows. The processing electronics, on receipt of the orientation word, sort the streams of data accordingly using FIFO and FILO registers as described previously.

Figure 6:
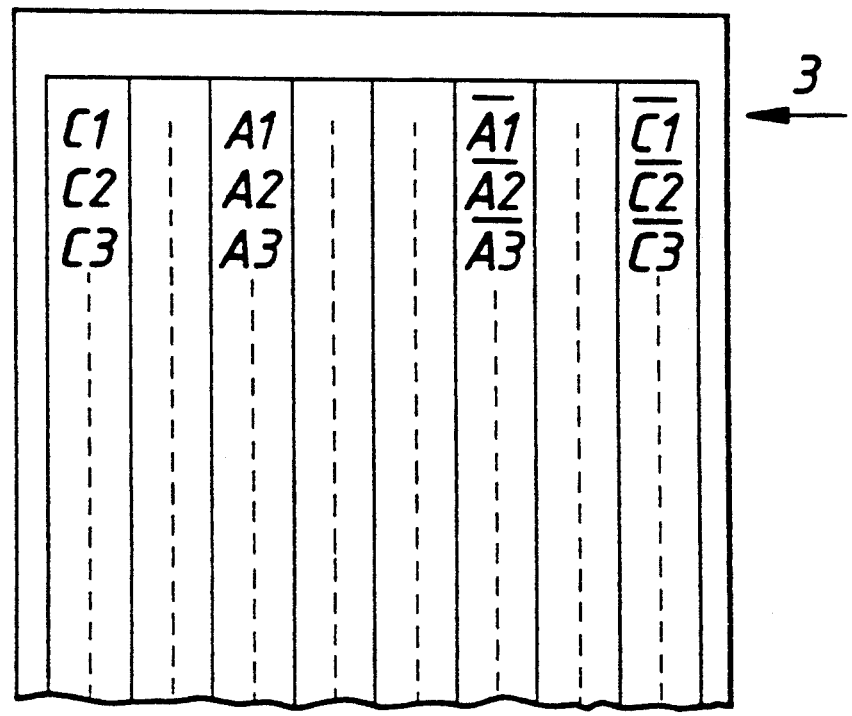

In FIG. 6, there are eight data streams in one row and the position of the sensors 3 is indicated by the arrow. The columns containing A, $\overline{A}$, C and $\overline{C}$ provide the clock signals for the other columns which contain the relevant data.

Figure 7:
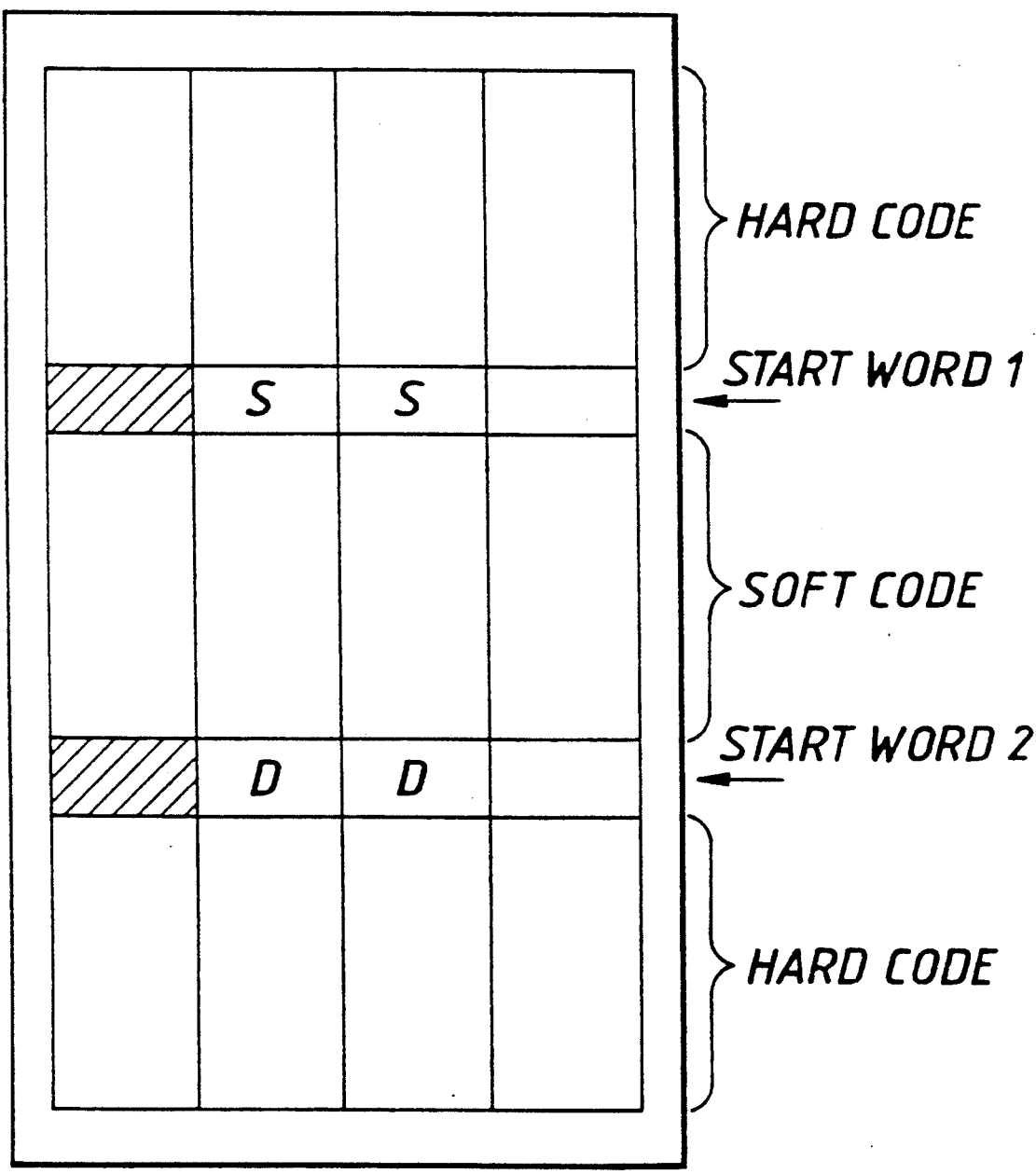

FIG. 7 illustrates a card having four unique orientation words which give the orientation of the card relative to the reader. In this embodiment, the centre two streams define which end of the card has been inserted first and the outer two streams define which face of the card is uppermost in the reader. The "hard code" regions are separated by the "soft code" region, each code area containing four columns of sixteen rows of encoded data. The data is written onto the card in one direction, for example, from top to bottom, with the "hard code" duplicated at the other end of the card. By repeating the "hard code," the card can be read with only two-thirds of its length inserted in the reader. If SS is in the orientation word, the bits of the data are presented in a given way and if DD is in the orientation word, the bits are presented in the reverse order.

Figure 8:
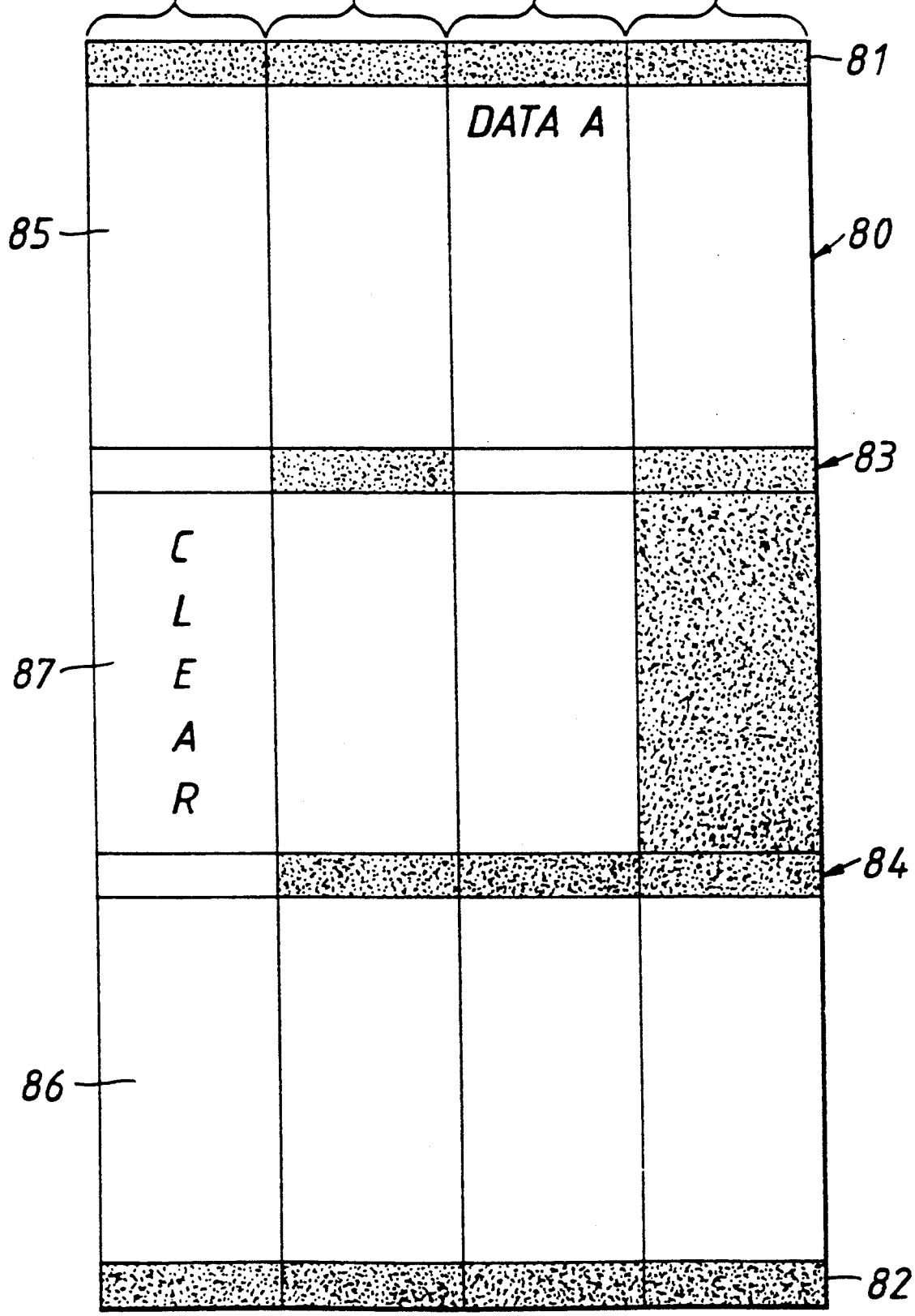

FIG. 8 illustrates a further embodiment of a coded card 80. In this embodiment, the data zones on the card are bounded by end bars 81 and 82. Two start words 83 and 84 are included in the data, one word 83 being for mode of presentation of the card and the other word 84 being for a reversed mode of presentation. The card 80 comprises three zones 85, 86 and 87. Zones 85 and 86 contain identical "hard" codes and zone 87 contains a "soft" code. Data is again stored in four streams for the "hard" code with "stream 2" holding true data (designated A). The other streams contain modified data, i.e. "stream 1" contains data B combined with a function of data A, "stream 4" is the complement of "stream 1," and "stream 3" contains a clock phase combined with a function of "stream 4." For the "soft" code, "stream 1" and "stream 4." contain constant level '1' and '0' respectively. "Stream 2" contains data C combined with a function of data A, and "stream 3" contains data D combined with a function of data B. The functions applied to the true data may be any mathematical or logical operation.

Figure 9:
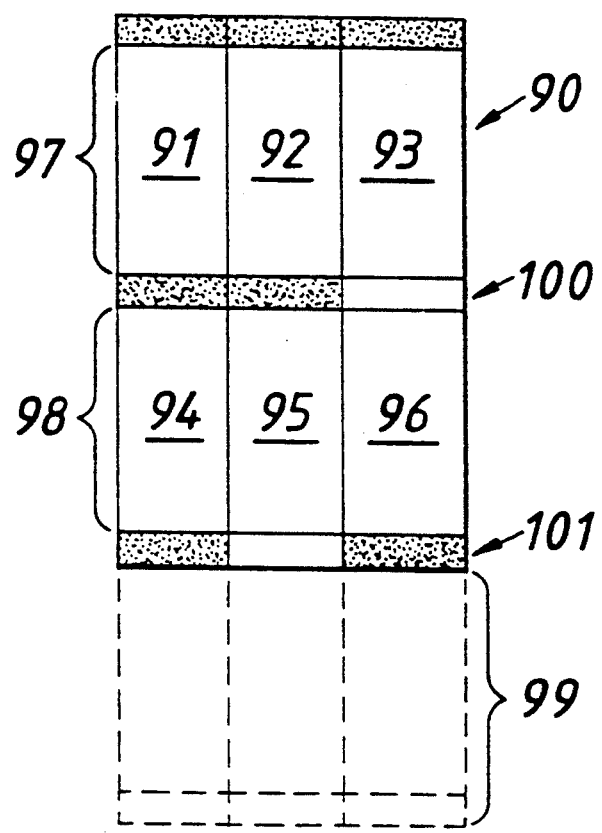

In FIG. 9, a permanently coded card 90 is shown. This card is permanently coded with a "hard" code at the time of its manufacture. Instead of eight data streams with four repeated as previously described, there are six data streams 91 to 96 as shown, divided into two zones 97, 98. If the card is to be used as a key, a handle may be attached to end 99 shown in dotted outline, and a start word 100 is used to indicate the presentation of the key. If the card is fully reversible and not used as a key, the end 99 contains the same data as in the upper zone 97 and start word 101 is also utilised. The data streams 91 to 96 are coded as required, for example, the data streams may be coded using the streams of FIG. 8 except for the two constant level streams.

Figure 10:
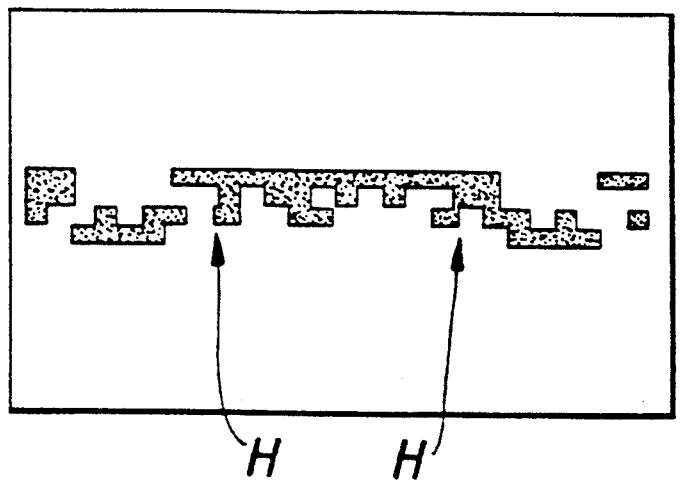
FIG. 10 shows an actual size typical card encoded patterns.

FIG. 10 shows an actual size coded card having data on it in zones as described above. Of particular note, and clearly visible in the FIGURE is the set of markings displaced by a half-cycle offset, denoted by the arrow H.

I claim:

1. A card for an optical card reader system, the card being substantially rectangular and readable by the card reader system regardless of the orientation of the card when inserted into the reader, comprising optically-readable data in each of five zones extending symmetrically in series along the card's longitudinal axis, wherein with reference to the longitudinal axis and the five zones in series, each outermost zone is separated from a central zone by an orientation word zone, and the data in each orientation word zone indicates when read by a card reader system how the data in the central zone and each outermost zone are to be processed thereby allowing for orientation of the card in the card reader system.

2. A card as claimed in claim 1 wherein each outermost zone contains identical data when read out in a direction as indicated by an orientation word contained in an adjacent orientation word zone.

3. A card as claimed in claim 1 or 2 wherein the data in each outermost zone is data encrypted with a clock signal, and the data in the central zone is data encrypted with data from an outermost zone.

4. A card as claimed in claim 1 or 2 wherein each outermost zone contains data written in a hard form.

5. A card as claimed in claim 4 wherein the central zone contains data written in a soft form.

6. A card as claimed in claim 1 or 2 wherein the central zone and each outermost zone contains data written in either a hard form or a soft form.

7. A card as claimed in claim 4 wherein the data in hard form includes a fixed number.

8. A card as claimed in claim 6 wherein the data in hard form includes a fixed number.

9. A card as claimed in claim 5 wherein the data in soft form is printed directly on the card.

10. A card as claimed in claim 6 wherein the data in soft form is printed directly on the card.

11. A card as claimed in claim 5 wherein the data in soft form is printed on an intermediate carrier which, subsequent to printing, is affixed to a major surface of the card.

12. A card as claimed in claim 6 wherein the data in soft form is printed on an intermediate carrier which, subsequent to printing, is affixed to a major surface of the card.

13. A card as claimed in claim 4 wherein each outermost zone contains data in hard form which is written on the card during manufacture of the card.

14. A card as claimed in claim 7 wherein each outermost zone contains data in hard form which is written on the card during manufacture of the card.

15. A card as claimed in claim 6 wherein each outermost zone contains data in hard form which is written on the card during manufacture of the card.

16. A card as claimed in claim 3 wherein data from which a series of clock pulses can be read forms part of the data in hard form on the card.

17. A card for use with an optical card reader system, the card comprising a first outer zone, a second outer zone and a central zone arranged along the length of the card with each containing optically-readable data; wherein each of said first outer zone and said second outer zone contain identical data which comprises a number unique to the card written in hard form on the card during manufacture of the card; the central zone contains data written in soft form; orientation word data is present on the card between the central zone and each of said first outer zone and said second outer zone which indicates to the card reader system how the data in the central zone and each of said first outer zone and said second outer zone is to be processed and thereby allow for the orientation of the card in the card reader system; and each of said first outer zone and said second outer zone contains encrypted clock pulses which can be read by the card reader system as the card is withdrawn from the card reader system.

18. A card reader system for reading an optically-coded card as claimed in claim 17 wherein the card reader system includes two rows of sensors spaced apart along a longitudinal axis of the card reader system wherein each row of sensors includes at least two sensors and the sensors present in each row are spaced apart widthwise across the card reader system along a longitudinal path which a card in the card reader system must follow; and wherein the card reader system includes a data-processing means and a proximity switch which is actuated upon insertion of a card into the card reader system to power the data-processing means and thereby permit data to be read from the card during subsequent withdrawal of the card from the card reader system; and wherein the data in the central zone and one of said first outer zone or said second outer zone are processed upon withdrawal of the card in accordance with the orientation word data present between the central zone and said one outer zone being processed to produce an output signal.

19. A card reader system as claimed in claim 18 wherein the data processing means is arranged to process four data signals in parallel wherein only two of said four data signals are processed at any one time so as to produce a reference level signal; and wherein the reference level signal is compared to each data input line to determine each data input line's instantaneous binary state.

* * * * *